Jan. 15, 1952     D. RAGLAND     2,582,718
DRILL STEM TESTING DEVICE
Filed Dec. 26, 1946     2 SHEETS—SHEET 1

Douglas Ragland - INVENTOR.

J.G. McKean
ATTORNEY.

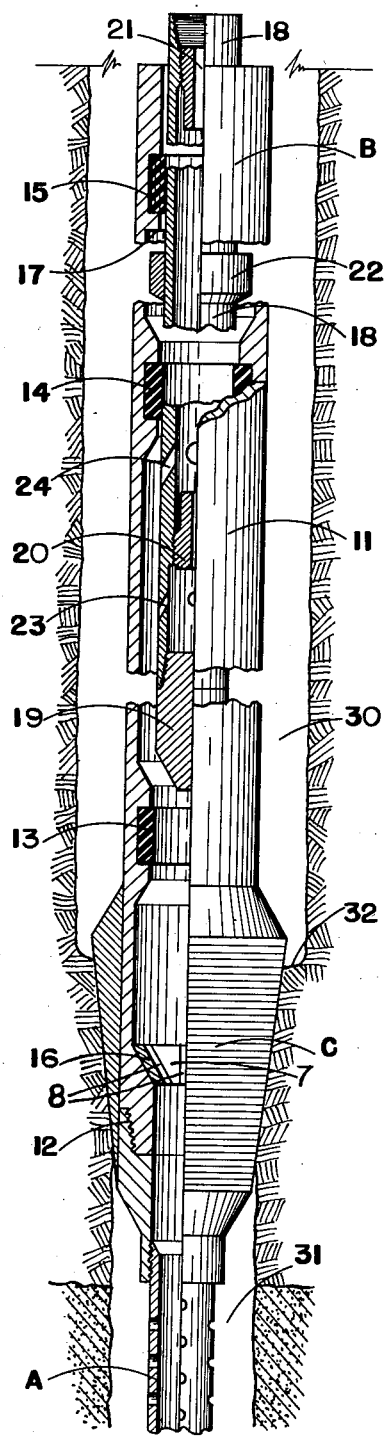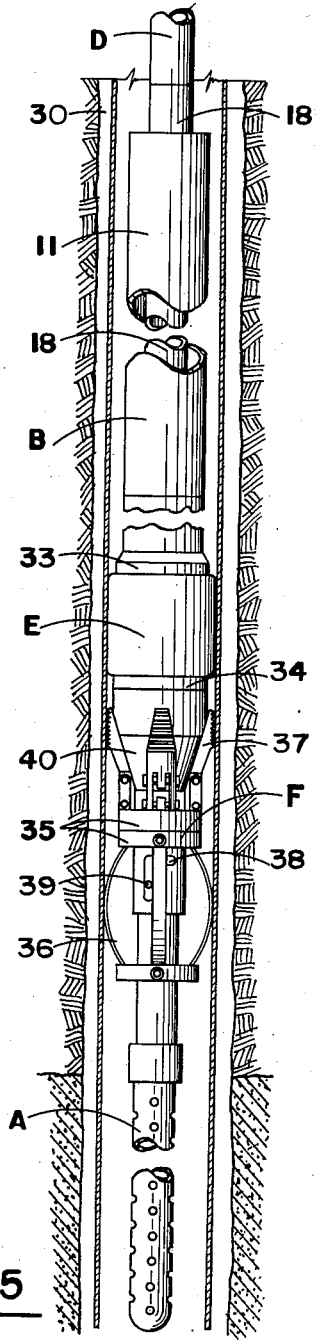
FIG. 4.
FIG. 5

Patented Jan. 15, 1952

2,582,718

UNITED STATES PATENT OFFICE 2,582,718

DRILL STEM TESTING DEVICE

Douglas Ragland, Houston, Tex., assignor, by mesne assignments, to Standard Oil Development Company, Elizabeth, N. J., a corporation of Delaware Application December 26, 1946, Serial No. 718,443

2 Claims. (Cl. 166—1)

The present invention is directed to a device adapted for testing the activity of underground formations and particularly the productivity of gas producing formations.

It is well known to the art to drill boreholes for the purpose of penetrating an underground reservoir whereby the content of the reservoir may be exploited.

The present invention is directed to a device adapted for testing the productivity of an underground formation and particularly for testing the productivity of a gas producing formation.

In the exploitation of underground reservoirs it is conventional to drill a borehole to penetrate the producing formation and then complete a well by setting a casing string, setting a tubing string inside the casing string and then producing fluid from the formation through the tubing string. Inasmuch as a number of potential producing formations are penetrated by a single borehole, it is desirable to test one or more of the potential producing formations to determine the productivity thereof prior to the completion of the well. The advantages of testing formations are well known to the art and may be summarized briefly as enabling an operator to select the most desirable producing formation prior to completing the well whereby the expense is avoided of completing in a plurality of potential formations before a commercially profitable formation is found.

Tools suitable for testing the productivity of fluid producing formations and particularly oil producing formations are known to the art. These tools may be described generally as involving a mandrel carrying a packing which, at the option of the operator, may be employed for packing off a rat hole or a full size hole with the tool provided with a valve below the packer and operable by manipulation by the operator whereby after the packer is set the valve may be opened to allow the flow of fluid into a string of tubing.

It is an object of the present invention to devise an improved tool for testing the productivity of underground formations. More particularly, it is an object of the present invention to devise a tool which will allow the productivity of gas producing formations to be determined.

The device of the present invention may be described briefly as involving a testing tool which allows the operator to test a gas sand penetrated by a borehole under at least two different rates of flow whereby the open flow productivity of the gas sand may be determined.

Other objects and advantages of the present invention will be seen from the following description taken in conjunction with the drawing wherein Fig. 1 is an elevation of an embodiment of the present invention provided with a cone packer and tail pipe suitable for testing the productivity of a formation penetrated by a rat hole;

Fig. 4 is a view of the embodiment as shown in Fig. 3, but with the parts in position for testing the productivity of the formation at a greater rate of flow; and Fig. 5 is an elevation of a device embodying the present invention provided with a packer which may be set in a cased borehole.

Figure 1:
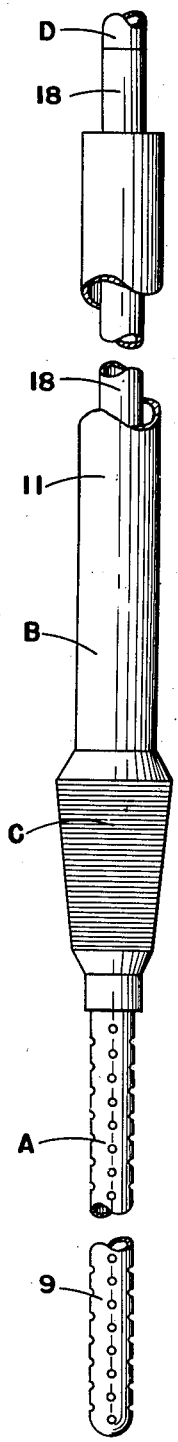

Turning now specifically to the drawing and first to the embodiment of Figs. 1 to 4, inclusive, the complete assembly includes a tail pipe A, testing tool B, packer C and string of flow pipe D. The tail pipe, packer and flow pipe are conventional to the art. It will be seen that packer C in this embodiment is a cone type packer adapted to pack off a rat hole.

The testing tool B includes packer mandrel 11 having a threaded connection 12 at its lower end for securing tail pipe A thereto. Mounted on the lower end of mandrel 11 is packer C.

It will be seen that packer mandrel 11 is generally tubular in shape and the interior thereof provides seating means for spaced packing means 13, 14, and 15. The lower end of packer mandrel 11 defines a stop member 16 and the upper end defines a stop member 17.

The inner surface of member 16 has a series of spaced ribs or lands 7 which alternate with grooves 8. Thus stop member 16 and plug 19 cooperate to form passages through which fluid may flow when plug 19 is seated on stop member 16 as in Fig. 3.

Figure 2:
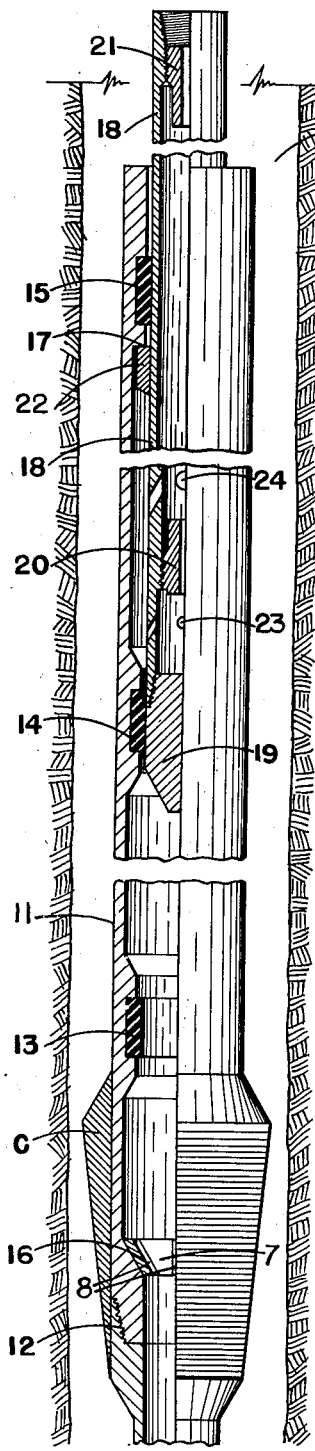
Fig. 2 is a view partly in section of the embodiment of Fig. 1 with the parts in position as the device is lowered in the borehole.

Slidably arranged within packer mandrel 11 is choke mandrel 18. It will be seen that choke mandrel 18 is of a general tubular shape with the lower end closed with plug 19. Mounted in choke mandrel 18 is a lower choke member 20 and an upper choke member 21. A stop member 22 is defined on the outer wall thereof which is arranged to contact stop shoulder 17 when the parts are in the position for lowering into the borehole as shown in Fig. 2. The wall of choke mandrel 18 defines a plurality of lower perforations 23 between plug 19 and lower choke 20 and a plurality of upper perforations 24 above choke 20. It will be evident in the drawing that upper perforations 24 define a larger flow area than lower perforations 23. It will also be evident in the drawing that upper choke 21 defines a larger flow area than that of lower choke 20.

In the construction of the testing tool of the present invention it is preferred that the area of openings defined by lower perforations 23 be larger than the area of the passage of lower choke 20. With this arrangement when the flow is solely through lower perforations 23, the volume of fluid produced is controlled by the area of choke 20. Similarly, it is preferred that the total area defined by perforations 24 and choke 20 be greater than that of the area of the passage of choke 21 whereby when the flow is through perforations 24 in addition to choke 20, the volume of fluid produced is controlled by the area of choke 21. Further, it is well known to the art that when flowing gas through a choke at a given pressure, the rate of flow is not substantially affected by the pressure on the downstream side of the choke until the latter is at least 40% of the pressure on the upstream side. Accordingly, it is desirable when constructing the device of the present invention that the flow area of choke 21 be sufficiently greater than the flow area of choke 20 so that the pressure on the downstream side of choke 20 will never be greater than 40% of the pressure on the upstream side thereof.

Figure 3:
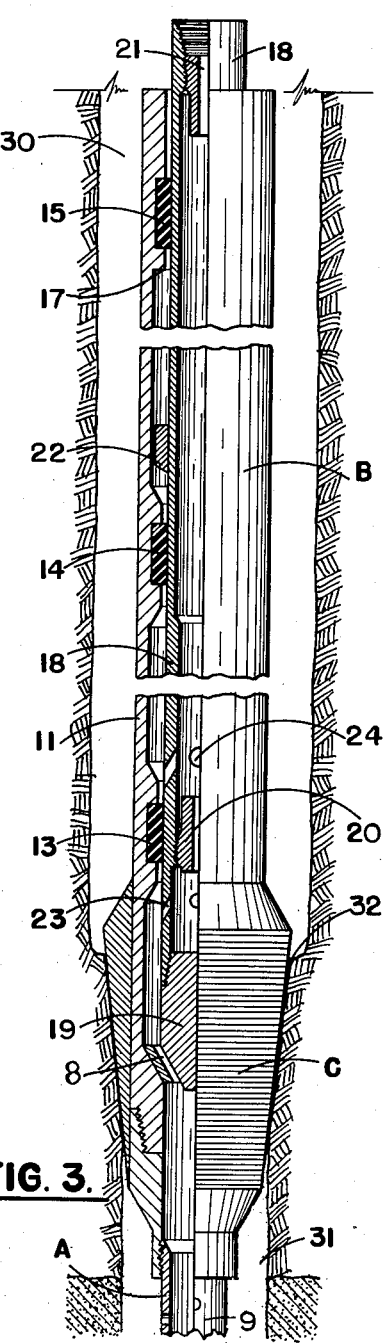
Fig. 3 is a view partly in section of the embodiment of the preceding figures shown in position for testing the productivity of a gas formation at a given rate of flow.

The use of the device of the present invention is illustrated in the series of Figs. 2, 3, and 4. In this series of figures, a large hole 30 has been drilled, and a rat hole 31 has been drilled ahead of the larger hole with a shoulder 32 connecting the two holes. In Fig. 2, the device is shown with its parts in the position they assume as the device is lowered down the borehole; the device is in hole 30 above rat hole 31 and shoulder 32 and in order to simplify the drawing a showing of the rat hole and shoulder has been omitted from this figure. It will also be seen in this figure that stop 22 is in contact with shoulder 17 with packing 14 contacting the wall of choke mandrel 18 at a point below perforations 23 and 24 whereby the interior of the choke mandrel is sealed off from contact with fluid in the borehole.

In Fig. 3 the device is shown in position with packer C seated on shoulder 32 to make a fluid tight seal closing off the rat hole from the remainder of the borehole. The string of flow pipe D and choke mandrel 18 have been lowered so that perforations 23 are below packing 13 whereby fluid from the rat hole may flow through the perforations 9 of tail pipe A upwardly through the space between stop member 16 and plug 19 thence through the passage defined by the lower end of the inner wall of packing mandrel 11 and outer wall of packing mandrel 18, through perforations 23, choke 20 and thence upwardly through choke mandrel 18 and the string of flow pipe D. As stated heretofore, the volume of fluid produced is controlled by the area of opening of lower choke 20 when the parts are in the relative position shown in this figure.

In Fig. 4 the parts of the device are shown in position to allow an increased flow of gas over that obtained when the parts are in the relative position of Fig. 3. In Fig. 4 the choke mandrel is raised to position above packing 13. With the parts in this position, fluid passes through tail pipe A and thence upwardly in the passage defined by packing mandrel 11 until the fluid is above packer 13 thence into the space defined by the inner wall of packer 11 and outer wall of choke mandrel 18 and thence through perforations 23 and 24. The fluid then passes through the passage defined by the choke mandrel with the volume of flow controlled by the area of the opening of upper choke 21.

The arrangement of auxiliary equipment, such as packers, in conjunction with the testing tool of the present invention may be altered in accordance with that section of the borehole adjacent the formation to be tested. The use of packers adapted to fit boreholes of various configurations and properties is well known to the art. An embodiment of the present invention carrying a packer adapted to be seated in a casing for testing the productivity of a formation is shown in Fig. 5. In this figure the packer is designated as E with the arrangement for setting the packer designated as F. Packer E is mounted on packer mandrel 11 with an upper ring 33 retaining the upper end of the packer in position and a base ring 34 at the lower end of the packer. Means for setting the packer includes sliding rings 35 carrying bow springs 36 and toothed slips 37. Carried by ring 35 is hook 38 adapted to engage with pin 39 carried by packer mandrel 11. Expanding cone 40 is mounted on the packer mandrel adjacent lower ring 34.

It will be seen that in Fig. 5, testing tool B carrying packer E is suspended from a string pipe D with tail pipe A connected to the bottom of tool B. When employing the assembly of Fig. 5, it will be understood that the assembly is lowered from the surface until tail pipe A is adjacent the formation to be tested. The formation is exposed to the wall of the hole either by being below the casing as indicated in the figure or by perforating the casing, by means not shown in the drawing. When the tail pipe is in the proper position, the packer is then seated to seal against the wall of the casing and the testing tool then manipulated in the same manner as described in connection with Figs. 2, 3, and 4 whereby gas is allowed to produce at two different rates from the formation under consideration whereby the open flow productivity of the gas producing formation may be determined.

It will be understood that the present invention is directed broadly to the arrangement of apparatus capable of determining the productivity of gas-producing formations by allowing the gas to flow from a formation at a plurality of different rates. While the apparatus shown in the drawing discloses an arrangement which allows two different areas of flow to be separately employed when testing a gas producing formation, it will be evident that by arranging additional spaced packing means and additional perforations and chokes that more than two flow areas may be included in the tool for use in testing formations. That is to say, instead of two chokes it may be provided with three or more chokes by arranging the chokes suitably in a moving element corresponding to element 18 and by providing suitable packing means and perforations. Such an embodiment has not been shown in the drawing but has been omitted therefrom in order to simplify the present application.

While I have disclosed specific embodiments illustrating the present invention, it will be apparent to a workman skilled in the art that various changes may be made without departing from the scope thereof. For example, the shape, sizes and proportions of the various members of the assemblies may be varied over a substantial range and satisfactory results obtained.

Having fully described and illustrated the device of the present invention, what is desired to be claimed as new and useful and to be secured by Letters Patent is:

1. A well testing tool comprising, in combination, a tubular packer mandrel, an external packer mounted on said packer mandrel for packing off the space between the tool and borehole wall, a tubular choke mandrel slidable longitudinally within the packer mandrel to assume an upper, an intermediate and a lower position therein, said choke mandrel having longitudinally spaced upper and lower ports intermediate its length, a first choke mounted within said choke mandrel above said upper port and a second choke defining a smaller flow opening than the first choke opening mounted within said choke mandrel between said upper and lower ports, a plug closing the lower end of said choke mandrel, a first stop means carried by the choke mandrel and engageable with a second stop means carried by the packer mandrel to retain the choke mandrel in its upper position with the packer mandrel hanging therefrom, a third stop means mounted at the lower end of the packer mandrel, and engageable with said plug to retain the choke mandrel in its lower position and forming passages through which fluid can flow when the choke mandrel is in said lower position, an upper packing member mounted on the inner wall of the packer mandrel at a point above said upper port of the choke mandrel, an intermediate packing member lesser in length than the distance between the upper and lower ports of said choke mandrel mounted on the inner wall of the packer mandrel at a point below the lower port of the choke mandrel and in contact with the wall of said choke mandrel when the choke mandrel is in its upper position, a lower packing member lesser in length than the distance between the upper and lower ports of said choke mandrel mounted on the inner wall of the packer mandrel below said intermediate packing member a distance greater than that between the upper port and the lower closed end of said choke mandrel and mounted above said third stop member a distance greater than that between the lower port and the lower closed end of the choke mandrel but less than the distance between the upper port and the lower closed end of said choke mandrel, said upper, intermediate and lower packing members each making a fluid tight seal with the outer wall of said mandrel when in contact therewith.

2. A device in accordance with claim 1 in which the area of the first choke is such that the pressure on the down-stream side of the second choke is never more than 40% of the pressure on the up-stream side when testing gas-producing formations.

DOUGLAS RAGLAND.

REFERENCES CITED

The following references are of record in the file of this patent:

UNITED STATES PATENTS

| Number | Name | Date |
| --- | --- | --- |
| 2,186,488 | Johnston et al. | Jan. 9, 1940 |
| 2,218,988 | Johnston et al. | Oct. 22, 1940 |